United States Patent [19]

Spaulding, Jr.

[11] 4,068,840
[45] Jan. 17, 1978

[54] PLAYING SURFACE FOR HANDBALL AND RACQUETBALL COURTS

[76] Inventor: Charles A. Spaulding, Jr., 13600 Clayton Road, Manchester, Mo. 63011

[21] Appl. No.: 712,672
[22] Filed: Aug. 9, 1976
[51] Int. Cl.² ........................ A63B 71/04; B32B 3/26
[52] U.S. Cl. ............................ 272/3; 273/95 H; 428/48; 428/53; 428/55; 428/71; 428/76; 428/314; 428/315
[58] Field of Search ................. 272/3; 273/95 H; 428/44–61, 71, 310, 315, 311, 313, 314

[56] References Cited

U.S. PATENT DOCUMENTS

| 2,875,117 | 2/1959 | Potchen et al. ............... 428/315 |
| 3,476,634 | 11/1969 | Fleischmann ................. 428/50 |
| 3,868,801 | 3/1975 | Weiner ......................... 52/309 |

FOREIGN PATENT DOCUMENTS

| 1,253,506 | 11/1971 | United Kingdom ............ 428/315 |
| 1,266,324 | 3/1972 | United Kingdom ............ 428/315 |

Primary Examiner—William J. Van Balen
Attorney, Agent, or Firm—D. A. N. Chase

[57] ABSTRACT

A playing surface suitable for handball, racquetball and similar games is presented by a composite panel having two structural and functional components comprising a base sandwich panel member for imparting strength and rigidity to the panel construction and a relatively thin, finish panel member having the requisite surface hardness. Each member is composed of prefabricated sections joined during assembly by spline and slot connections, the lines of joinder of the finish panel sections being substantially out of alignment with the joint lines of the base panel sections to increase the strength of the composite panel. The panel construction forms a self-supporting wall and thus may be employed exclusively in the construction of playing courts, or use in conjunction with conventional walls, ceilings and floors as desired.

5 Claims, 4 Drawing Figures

PLAYING SURFACE FOR HANDBALL AND RACQUETBALL COURTS

This invention relates to improvements in the construction of surfaces that form a playing area for handball, racquetball or similar athletic games.

Handball and racquetball are played in an enclosed room where the four wall surfaces are vertical and planar and the floor and ceiling are horizontal and planar. The enclosed room forms a court in which, after the serve, the ball may be played off any of the room surfaces as long as it strikes the front wall in its flight.

Handball, racquetball, paddleball, squash tennis, squash racquets and other athletic games of a similar nature utilize the same type of playing surface, but some require a court of different dimensions and number of walls than others. This invention, therefore, relates to all athletic games of this kind with the size of the panels merely being changed and adapted accordingly.

In the past, concrete, slate, plaster, wood and sandwich panels having a foam core between two relatively thin sheets of particle board have all been used to form the walls of handball and racquetball courts. Depending on the material, it has been common practice to face the walls with an epoxy finish coating. Although generally satisfactory, these wall structures are relatively expensive and time consuming to erect. The epoxy coating is a finishing step and is applied after the court is constructed, and produces a surface that is easily marred by scuff marks, ball marks and racquet scrapes. If hollow areas are present in the walls, the playing ball will not rebound true and an inconsistent bounce will result. The quality of the wall construction is a further variable that can only be closely controlled by employing skilled labor which, of course, adds materially to the cost.

With the foregoing in view, it is the primary object of the present invention to provide an improved playing surface for handball, racquetball and similar sports, wherein such playing surface is easy to construct in a uniform manner and is durable and hard.

Another important object of the invention is to provide a playing surface as aforesaid where the appropriate ball will always and consistently bounce true.

Still another important object is to provide a playing surface as aforesaid whose components are prefabricated for on-site assembly, thereby decreasing the cost of the playing surface and the time required for construction.

Still another important object of the invention is to provide a playing surface presented by a wall assembled from panel sections, yet having an internal structure that renders the wall entirely self-supporting to obviate the need for external framing.

Yet another important object of this invention is to provide a playing surface that is presented by a composite panel having two structural and functional components, one of which is a base panel for imparting strength and rigidity to the assembly and the other of which is a finish panel having the requisite surface hardness.

An additional object of this invention is to provide a playing surface presented by a panel construction which has no fastening devices on or adjacent its inner surface such as nails or screws of a different, uncomplementary composition, thus insuring that the ball will bounce true regardless of where it is played.

In the drawings:

FIG. 1 is a perspective view of a handball-racquetball court. The front wall and far sidewall of the court are illustrated with the joint lines of the melamine finish panels (to be described) emphasized. The near sidewall is broken away to reveal the details of the internal construction. A portion of the near sidewall and the entire back wall and ceiling are transparent and shown in phantom outline solely for purposes of illustration.

Figure 1:
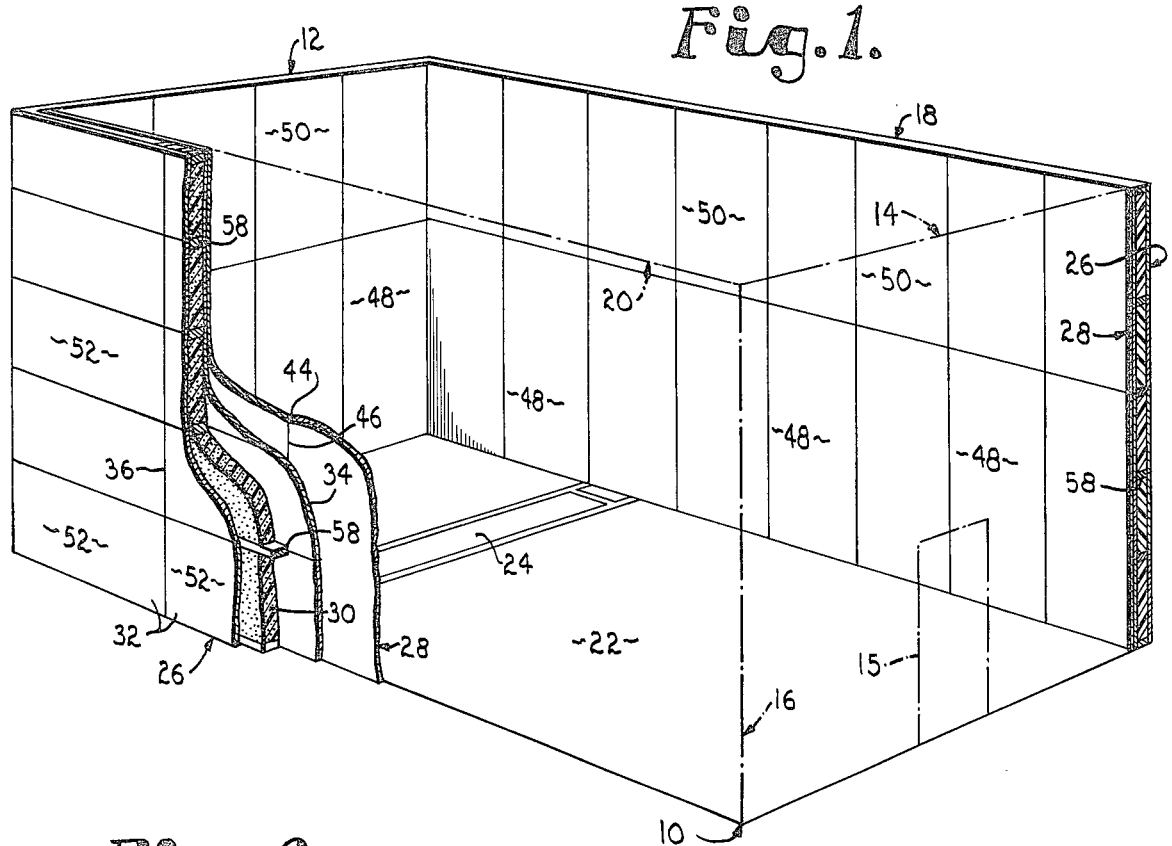

Referring initially to FIG. 1, the handball-racquetball court 10 there illustrated has six playing surfaces comprising front wall 12, back wall 14 with a door 15, sidewall 16 (nearest viewer), sidewall 18 (farthest from viewer), ceiling 20 and playing floor 22 which is marked to designate the serving area 24. A spectators' balcony (not shown) could be located along the top portion of the back wall 14; thus such top portion may be constructed of transparent glass or plastic. The four walls and ceiling will commonly be colored white, while the floor usually takes on a hardwood appearance. Any or all of the playing surfaces may be constructed in accordance with the teachings of the present invention. In practice, the front wall 12 or one of the sidewalls of the court could be a load bearing external wall of the building, in which case masonry construction may be preferred.

In the illustrated embodiment the front wall 12 and the sidewalls 16 and 18 are shown in detail, and each is formed by a composite panel comprising a base sandwich panel member 26 and a relatively thin, finish panel member 28. Each of these panel members is composed of a number of individual, rectangular panels or sections and the construction is best understood from the cut-away view of sidewall 16 in FIG. 1 and the horizontal cross-sections of FIGS. 3 and 4. These illustrations may be directly compared as each of the walls is of identical construction except for the number of panel sections employed.

Each panel section of the base member 26 has a foam core 30 sandwiched between opposed sheets 32 and 34 of a rigid, structurally strong material such as particle board. Styrofoam is preferred for the core 30, but other foamed materials may be used such as polyurethane. However, since the structural strength of polyurethane is not necessary in the present construction, styrofoam is preferred since it is relatively inexpensive and is fire resistant. As is evident in FIGS. 3 and 4, adjacent panel sections of the base member 26 are joined at their abutting edges by a spline and slot connection to be described more fully hereinafter, and may be visualized as being united at a line of joinder 36 where the edges of the face sheets 32 and 34 abut.

The finish panel member 28 is likewise formed from prefabricated sections and is in direct surface contact with the inside sheets 34 of the base member 26, a suitable adhesive being employed to secure the finish member 28 to the surface. Each panel section of the finish member 28 comprises a layer 38 of impact-resistant material such as particle board faced on either side with a smooth, hard, impact-resistant skin bonded to the layer 38. Preferably, the panel is a sandwich of melamine resin-impregnated paper thermal-fused to the opposed faces of the layer 38, the latter presenting the core of the sandwich.

Figure 4:
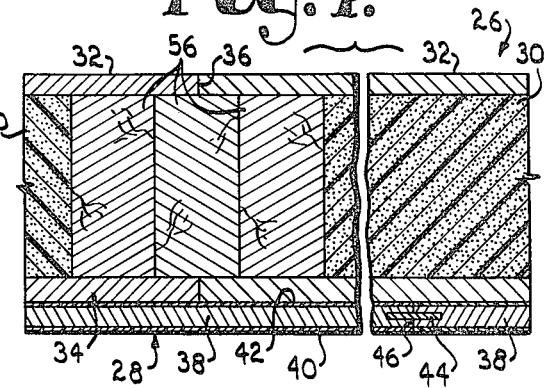
FIG. 4 is a cross-section similar to FIG. 3 but on an enlarged scale to permit the melamine skinned panels and a joining spline therefor to be seen in relation to the base sandwich panels.

As may be seen in FIG. 4, the resin-impregnated sheets provide an outer skin 40 which presents the playing surface and an inner skin 42 that is directly adhered to the base member 26. The panel sections of the finish member 28 are joined in edge-to-edge relationship by a spline and slot connection comprising a spline 44 received within opposed longitudinal slots in the abutting edges of adjacent panel sections, such slots being in registration with each other to form a blind joint where the surface presented by the outer skins 40 of the adjacent sections is uninterrupted at the line of joinder 46 defined by the abutting edges.

Accordingly, it may be appreciated from the foregoing that the composite panel construction of the present invention employs two components, the base panel member 26 and the finish panel member 28. Each of these components has separate functions. The base member 26 imparts strength and rigidity to the composite panel, rigidity being of special importance in handball and racquetball courts in order to provide a "live court," i.e., a playing surface that will properly rebound the ball and will not have dead areas. The core 30 ensures this rigidity and eliminates voids in the wall structure so that the composite panel is compatible with concrete walls and floors or other conventional construction materials. The melamine finish member 28, however, adds the necessary hardness and durability at the playing surface which will be struck by the ball and, likewise, occasionally struck by the players, racquets, etc. The melamine outer skin 40 and the core layer 38 are both highly resistant to impact and will not be marred or dented even when inadvertently struck by a racquet in the course of play. The melamine, however, is not extremely brittle and is resistant to cracking on impact, and thus is selected as the resin component for the skin. The opposing, inner skin 42 serves to minimize any tendency of the finish member 28 to warp under expansion or contraction.

The floor 22 of the court 10 could employ the two-component composite panel construction of the present invention with a melamine surface in a wood-grain design for esthetic purposes. Of course, the floor can remain concrete or hardwood as is the current practice. The ceiling 20 may likewise employ the present invention with the usual lighting fixtures added as is common in the art.

A handball-racquetball court is 40 feet (12.19 meters) long, 20 feet (6.10 meters) wide and 20 feet high. The panel sections of the finish members 28 are each either 5 feet (1.52 meters) by 12 feet (3.66 meters) or 5 feet by 8 feet (2.44 meters). The base members 26 are constructed from elements or sections which measure 4 feet (1.22 meters) by 8 feet.

Each sidewall 16 or 18 is assembled from eight 5 × 12 finish panel sections 48 standing on their 5 foot ends with a 5 × 8 section 50 on top of each, to form the 20 × 40 finish member component 28 of the composite panel. The base member component is constructed from twenty-five panel elements 52 laid end to end in rows of five and stacked in columns of five to form the 20 × 40 foot expanse of the sidewall. See FIG. 1.

The front wall 12 consists of four 5 × 12 foot finish sections 48 standing on their 5 foot ends with a 5 × 8 foot finish section 50 on top of each to form the 20 × 20 finish member component 28 of the composite panel. As indicated by the broken lines in FIG. 2, ten panel elements 52 are arranged and joined in two columns of five to form a 16 × 20 base member portion. The remaining 4 by 20 piece of the base member of the front wall 12 at the right margin in FIG. 2 is formed by a 4 × 4 foot square panel element 54 at the upper right corner atop two upright 4 × 8 elements 52.

In constructing the court 10, the base panel elements are assembled first and then the finish panel sections are set in place and secured. In the case of the walls, they are entirely self-supporting and do not require studs or other external framing unless they are to also be employed as a substantial load-bearing part of the building structure. The manner in which the walls are secured to one another and to the adjacent ceiling 20 and floor 22 is only fragmentarily illustrated as various means will be apparent to those skilled in the construction art. It is important, however, to appreciate that the various panels are supplied to the job site in prefabricated form and, as discussed, are of two quite separate and distinct types, i.e., the base panels and the finish panels. The base panels may be subjected to relatively rough handling without impairing the quality of the workmanship since their surfaces are ultimately hidden when the finish panels are set in place. Since the finish panels are relatively light and easy to handle, they are not as likely to be damaged in completing the fabrication of the court structure and, therefore, the speed with which the work may progress is enhanced without detracting from the quality of the playing surface produced. This is a decided advantage in the two-component construction of the present invention in that a single component panel with a prefinished surface would require special handling in order to prevent damage and a resulting substandard playing surface.

Furthermore, the use of thin panel sections for the finish members 28 makes it easier to obtain true joints with coplanar surfaces than with a thick wall. This is very important in a playing court where transitions from one panel section to the next over the expanse of the surface must not be apparent, both from the psychological standpoint of the esthetics of the court and the adverse effect any nonplanar surface sections would have on the rebounding of the ball. In the event that, during erection, certain of the joints of the base panel elements are not exactly true, the two-component design enables this to be corrected at the time that the finish panel sections are installed.

Figure 2:
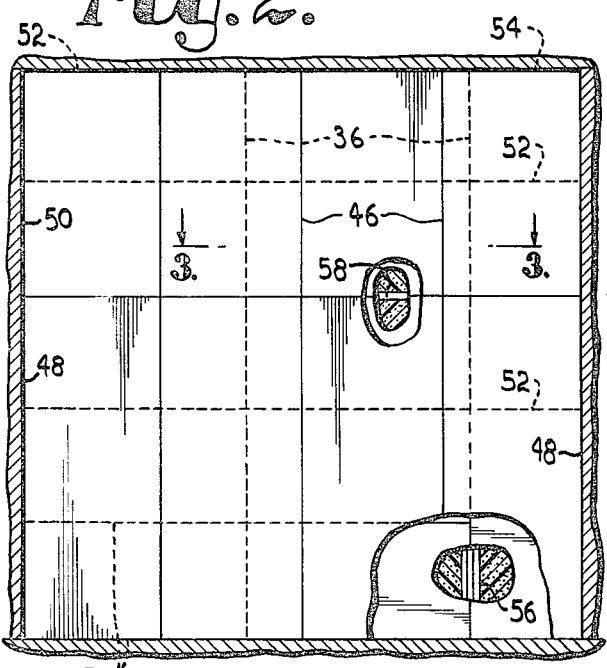
FIG. 2 is an elevational view of the front wall with parts being broken away to reveal the spline fastening arrangements for both the melamine finish panels and the base sandwich panels. The solid joint lines define the edges of the finish panels while the broken lines represent the edges of the base panels therebehind.

In FIG. 2 it may be noted that the vertical lines of joinder 36 of the base panel elements are not in alignment with the vertical lines of joinder 46 of the finish panel sections. This is done purposely in the present invention in order to increase the strength of the composite panel configuration. Due to the use of base and finish panel sections of different dimensions and orientations as discussed above, this substantial misalignment of the joint lines occurs over the expanse of the sidewalls 16 and 18 as well.

Figure 3:
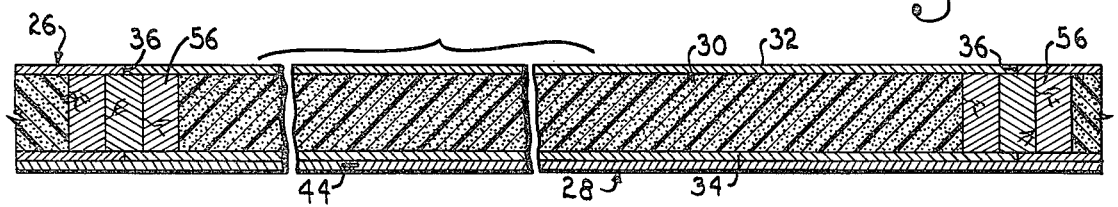
FIG. 3 is an enlarged, fragmentary, horizontal cross-sectional view taken along line 3—3 of FIG. 2.

Referring particularly to FIGS. 3 and 4, joinder of the panel elements of the base member 26 is facilitated by the spline and groove connections in which the vertical spline is composed of three boards 56 that may, for example, be common 2 × 4 stock. Assuming this to be the case for purposes of illustration, the total spline is 4

× 6 inches in cross-section and, therefore, projects approximately 3 inches on either side of the line of joinder 36. The core 30 is correspondingly recessed at the vertical edges of the panels. The panels may be fabricated with a slot at one vertical edge and the spline 56 secured in the opposite vertical edge to facilitate assembly in tongue and groove fashion.

In FIGS. 1 and 2 it may be seen that splines 58 are employed at the joints formed by the horizontal edges of the base panel elements 52. Here a single wooden spline of 2 × 4 stock is sufficient.

With respect to the finish panel sections 48 and 50, it should be understood that a blind joint is employed at their abutting horizontal edges (the top edge of section 48 and the bottom edge of section 50) of the same type illustrated in FIG. 4 where the spline 44 is shown at the vertical line of joinder 46. Accordingly, all of the sections of the playing surface presented by the outer skins 40 are held in planar alignment by blind joints in which the splines thereof are cemented in the registering slots as the sections are installed. Therefore, a permanent edge-to-edge bond is formed to maintain a smooth, uninterrupted playing surface without the use of metal fasteners such as screws or nails at or adjacent the playing surface. Since the trueness of the playing surface is assured by the joined finish panel sections, the base panel elements may be rapidly roughed in before the finish panels are installed.

The playing surface of the present invention is compatible with the surface provided by masonry walls or concrete floors insofar as the rebounding of the ball is concerned, but the chance of injury to a player is materially reduced. Although the light, resilient playing ball is returned by the smooth, hard surface of the present invention in the same manner as a concrete surface, for example, the wall structure has sufficient resilience when struck by a player's body to significantly lessen the probability of injury.

Having thus described the invention, what is claimed as new and desired to be secured by Letters Patent is:

1. In a court for handball or racquetball or the like, where a playing surface is presented by a panel structure that includes a relatively thick, base sandwich panel member having a foam core interposed between opposed sheets for imparting the desired bounce to a ball played off the panel structure, said base panel member including a plurality of panel elements thereof joined in edge-to-edge relationship, the improvement in said panel structure comprising:
   a thin finish panel member on said base member in direct surface contact therewith, said finish member including a layer of impact-resistant material faced with a smooth, hard, impact-resistant skin bonded to said layer and presenting an outer playing surface characterized by durability and hardness,
   said finish member further including a plurality of panel sections thereof presenting respective portions of said playing surface; and
   means for joining said panel sections, during on-site construction of the composite panel structure, in edge-to-edge relationship with the respective surface portions thereof in planar alignment,
   the lines of joinder of the elements of a planar expanse of said base member being substantially out of alignment with the lines of joinder of the sections of the finish member thereon, whereby the resultant, comparatively inexpensive playing surface is resistant to mars and dents and provides a consistently true bounce for the playing ball.

2. The improvement as claimed in claim 1, wherein said finish member is of sandwich construction and has a core defined by said layer and faced with said skin and an opposing, inner skin.

3. The improvement as claimed in claim 2, wherein said skins comprise resin impregnated sheets bonded to said core.

4. The improvement as claimed in claim 1, wherein the abutting edges of each pair of adjacent sections of said finish member have opposed longitudinal slots in registration with each other at the respective line of joinder of the sections, and wherein each of said lines of joinder of said sections is presented by a blind joint having a spline received within corresponding slots and constituting said joining means.

5. The improvement as claimed in claim 4, wherein said elements of the base member are provided with spline and slot connections at the edges of the elements presenting said lines of joinder thereof.

* * * * *